UNITED STATES PATENT OFFICE.

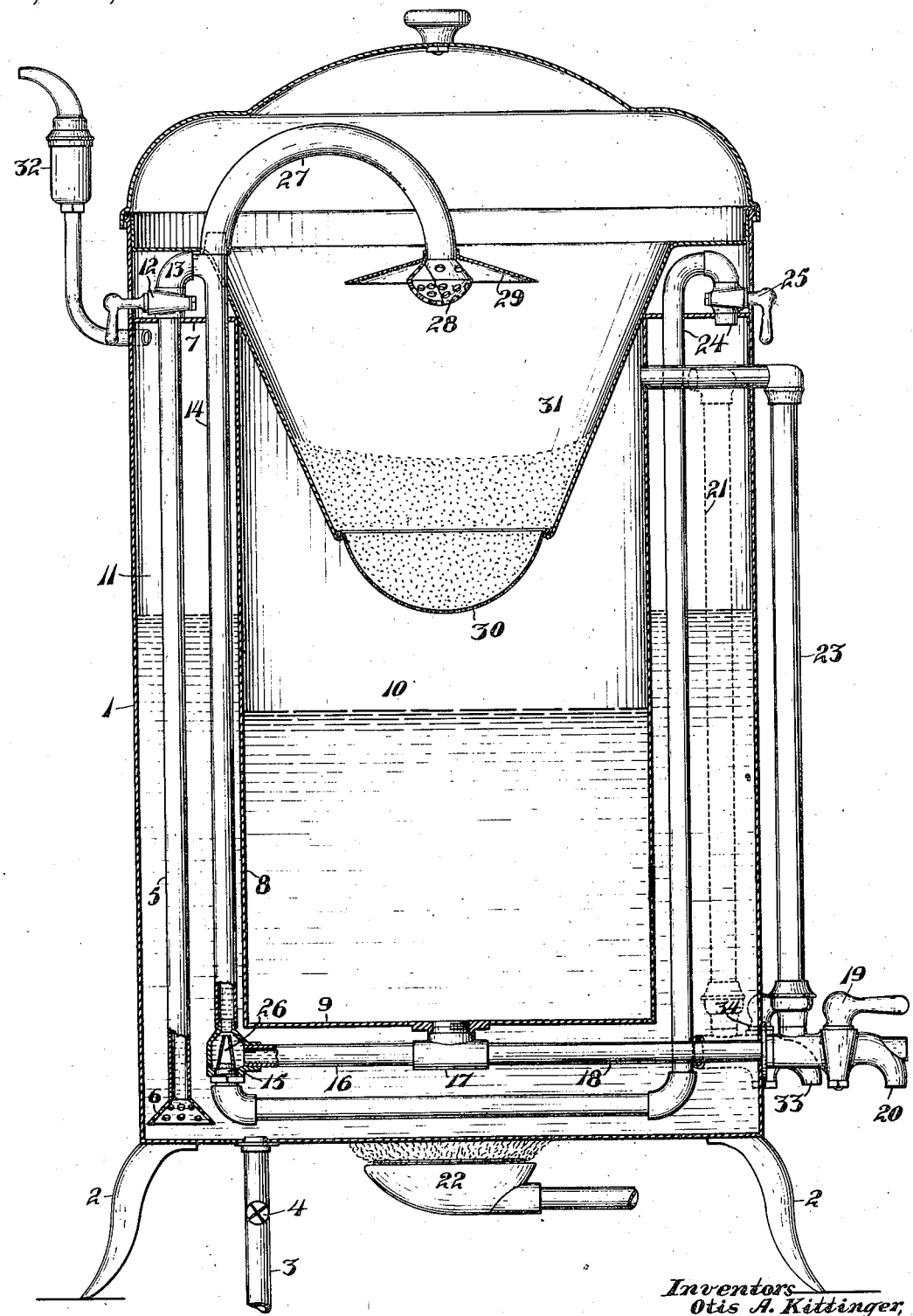

OTIS A. KITTINGER AND THOMAS J. TOPPER, OF SAN FRANCISCO, CALIFORNIA.

COFFEE-URN.

1,179,011.  Specification of Letters Patent.  Patented Apr. 11, 1916.

Application filed June 26, 1915. Serial No. 36,550.

*To all whom it may concern:*

Be it known that we, OTIS A. KITTINGER and THOMAS J. TOPPER, citizens of the United States, residing at San Francisco, in the county of San Francisco and State of California, have invented new and useful Improvements in Coffee-Urns, of which the following is a specification.

The present invention relates to improvements in coffee urns for making coffee in large quantities for use in restaurants, hotels, schools and the like, the object of the invention being to provide simple and convenient means whereby the boiling water can be caused to circulate through the coffee a large number of times in succession so as to extract the essential elements of the coffee.

In the accompanying drawing, Figure 1 is a vertical central section of our improved coffee urn, certain parts being shown in side elevation.

Referring to the drawing, 1 indicates the outer shell of the coffee urn, preferably cylindrical in form, and supported upon legs 2. Communicating with the interior of this shell is a water supply pipe 3 controlled by a valve 4. Within the shell is a pipe 5, having at its lower end a flaring mouth 6 formed with holes for ready admission of the water into said pipe. Said pipe depends from a horizontal partition 7 connecting the shell with an inner cylindrical shell 8 having a closed bottom 9, and forming a coffee chamber 10, the space 11 between said inner and outer shells forming a water supply and steam chamber. Above the partition 7 the pipe 5 communicates through a valve 12, and by means of an elbow 13, with a pipe 14, which also extends downwardly through said partition into said chamber 11 and communicates at its lower end with an enlarged elbow 15, which in turn communicates with a horizontal pipe 16 communicating by means of a T 17 with the coffee chamber. By means also of said T coffee can be drawn out from the coffee chamber by a pipe 18, extending through the outer shell and being there supplied with a valve 19 and spout 20.

When a sufficient amount of water has been supplied to the coffee urn, as indicated by the level gage 21, shown in dotted lines, the valve 4 is closed and the valve 12 is opened and water in the chamber 11 is heated by means of a gas or other burner 22 below the coffee urn. The heat being continued for a sufficient length of time, steam is generated in the chamber 11, the pressure of which forces water from the chamber 11 up the pipe 5, and by the pipes 14 and 16 into the coffee chamber. When a sufficient quantity of water has been admitted to said chamber, as indicated by a level gage 23, connected to said chamber, the valve 12 is closed. The steam then escapes by means of a pipe 24 controlled by a valve 25 and leading out from the top of said chamber 11, then through the top of said chamber and through said chamber and terminating in a nozzle 26 directed upwardly into the lower end of the pipe 14. Steam escaping from said chamber through said pipe 24 and finally forced upward into the pipe 14 carries with it water from the coffee chamber flowing through the pipe 16. Said water being forced upward escapes at the top of the pipe 14 into a curved pipe 27, the outer end of which is directed downwardly and terminates in a spraying nozzle 28 around which is a deflector 29. By this spraying nozzle the boiling water is sprayed upon the top of coffee contained in a bag or partition 30 of cloth or similar porous material extending across the coffee chamber and also in a conical container 31, from the bottom of which said bag is suspended, the top of said container being connected with the outer shell above the partition 7. The water percolates through the coffee in said bag and holder and drips therefrom into the coffee chamber 10 and is again, by the force of the steam in the chamber 11, drawn from said chamber 10 and is thus caused to circulate repeatedly through said pipe 27, coffee bag 30, coffee chamber 10 and pipe 16. It will be seen that this process can be continued for an indefinite period without any manipulation by the attendant except that of opening and closing the valves.

A safety valve 32 is provided to allow of the escape of steam in order to prevent the steam pressure becoming dangerously high. A spout, shown in dotted lines at 33, leads from the water chamber and is provided with a valve 34.

We claim:—

A coffee urn comprising a coffee chamber, a water chamber surrounding the coffee chamber, a conduit in the water chamber leading from a lower part of the coffee chamber and discharging into an upper part thereof and having an intermediate enlarged part below the level of the top of the coffee chamber, a steam pipe leading from the upper portion of said water chamber through said water chamber, and a nozzle communicating with the free end of the pipe and contained in the enlarged intermediate part of said conduit and discharging into a contracted portion thereof.

In testimony whereof we have hereunto set our hands in the presence of two subscribing witnesses.

OTIS A. KITTINGER.
THOMAS J. TOPPER.

Witnesses:
F. M. WRIGHT,
D. B. RICHARDS.